(12) United States Patent
Karoliussen

(10) Patent No.: US 10,746,331 B2
(45) Date of Patent: Aug. 18, 2020

(54) METHOD AND A DEVICE FOR SEALING BETWEEN ATTACHABLE PAIR OF PIPE FLANGES

(71) Applicant: OTECHOS AS, Tvedestrand (NO)

(72) Inventor: Hilberg Inge Karoliussen, His (NO)

(73) Assignee: OTECHOS AS, Tvedestrand (NO)

( * ) Notice: Subject to any disclaimer, the term of this patent is extended or adjusted under 35 U.S.C. 154(b) by 69 days.

(21) Appl. No.: 16/068,271

(22) PCT Filed: Jan. 17, 2017

(86) PCT No.: PCT/NO2017/000003
§ 371 (c)(1),
(2) Date: Jul. 5, 2018

(87) PCT Pub. No.: WO2017/126973
PCT Pub. Date: Jul. 27, 2017

(65) Prior Publication Data
US 2019/0003622 A1 Jan. 3, 2019

(30) Foreign Application Priority Data
Jan. 19, 2016 (NO) .................................. 20160084

(51) Int. Cl.
*F16L 23/20* (2006.01)
*F16J 15/08* (2006.01)
*F16L 23/24* (2006.01)

(52) U.S. Cl.
CPC ........... *F16L 23/20* (2013.01); *F16J 15/0887* (2013.01); *F16L 23/24* (2013.01)

(58) Field of Classification Search
CPC . F16L 23/02; F16L 23/18; F16L 23/20; F16L 23/22
(Continued)

(56) References Cited

U.S. PATENT DOCUMENTS 1,825,962 A 10/1931 Laird
1,965,273 A 7/1934 Wilson
(Continued)

FOREIGN PATENT DOCUMENTS

DE 19503285 A1 8/1996
EP 0267116 A1 * 5/1988 .............. F16L 23/20
(Continued)

OTHER PUBLICATIONS

Grunfeld, David, "International Search Report," prepared for PCT/NO2017/000003, dated May 3, 2017, three pages.

*Primary Examiner* — David Bochna

(74) *Attorney, Agent, or Firm* — Ross T. Robinson

(57) ABSTRACT

Method and assembly of a pair of pipe flanges, a sealing ring and tensioners for sealing between the pair of flanges. At least one flange face has a circular groove to at least partly receive a sealing ring which has its ring wall rectilinear as seen in a cross-section when front faces of the pipe flanges are spaced apart. The ring fits at least partly into the flange groove. The ring in side view exhibits a truncated cone shape. The pipe flanges are attached to each other such that the flanges in operative state are forcibly held in abutting and facial engagement, and that upon tensioning of the tensionersto create said operative state, compressive forces act onto the sealing ring to yield that its wall, viewed in cross-section, is bent radially to exhibit a curved configuration. The groove may in an embodiment exhibit an isosceles trapezoid cross-section.

30 Claims, 9 Drawing Sheets

(58) Field of Classification Search
USPC .......................................................... 285/368
See application file for complete search history.

(56) References Cited

U.S. PATENT DOCUMENTS

| | | | | |
|---|---|---|---|---|
| 2,452,469 | A | | 10/1948 | Johnson |
| 2,703,722 | A | * | 3/1955 | Christophersen ....... F16L 23/20 285/367 |
| 2,992,840 | A | * | 7/1961 | Reynolds ................ F16L 23/10 285/367 |
| 3,125,362 | A | * | 3/1964 | Borg ....................... F16L 23/20 285/363 |
| 3,630,553 | A | | 12/1971 | Foulger |
| 4,193,617 | A | * | 3/1980 | Hitz ........................ F16L 23/20 285/363 |
| 4,202,556 | A | | 5/1980 | Makishima et al. |
| 4,282,643 | A | | 8/1981 | Yamasaki et al. |
| 4,478,439 | A | * | 10/1984 | Arnold ................... F16L 23/20 285/368 |
| 2004/0021272 | A1 | * | 2/2004 | Hanashinna ........... F16L 23/20 277/627 |
| 2007/0087606 | A1 | * | 4/2007 | Shelef .................... F16L 23/18 439/274 |

FOREIGN PATENT DOCUMENTS

| | | | | |
|---|---|---|---|---|
| FR | 2036502 | A5 | * 12/1970 | ............. F16L 23/20 |
| GB | 928699 | A | 6/1963 | |

* cited by examiner

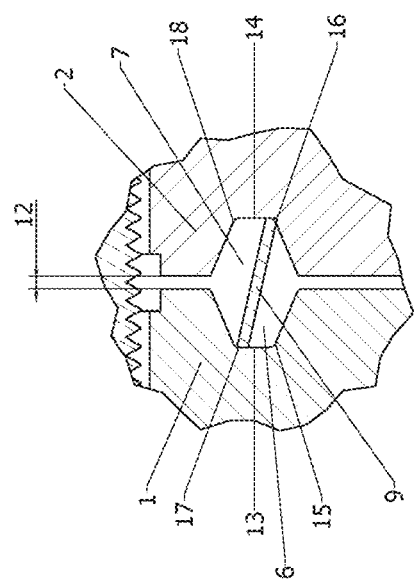
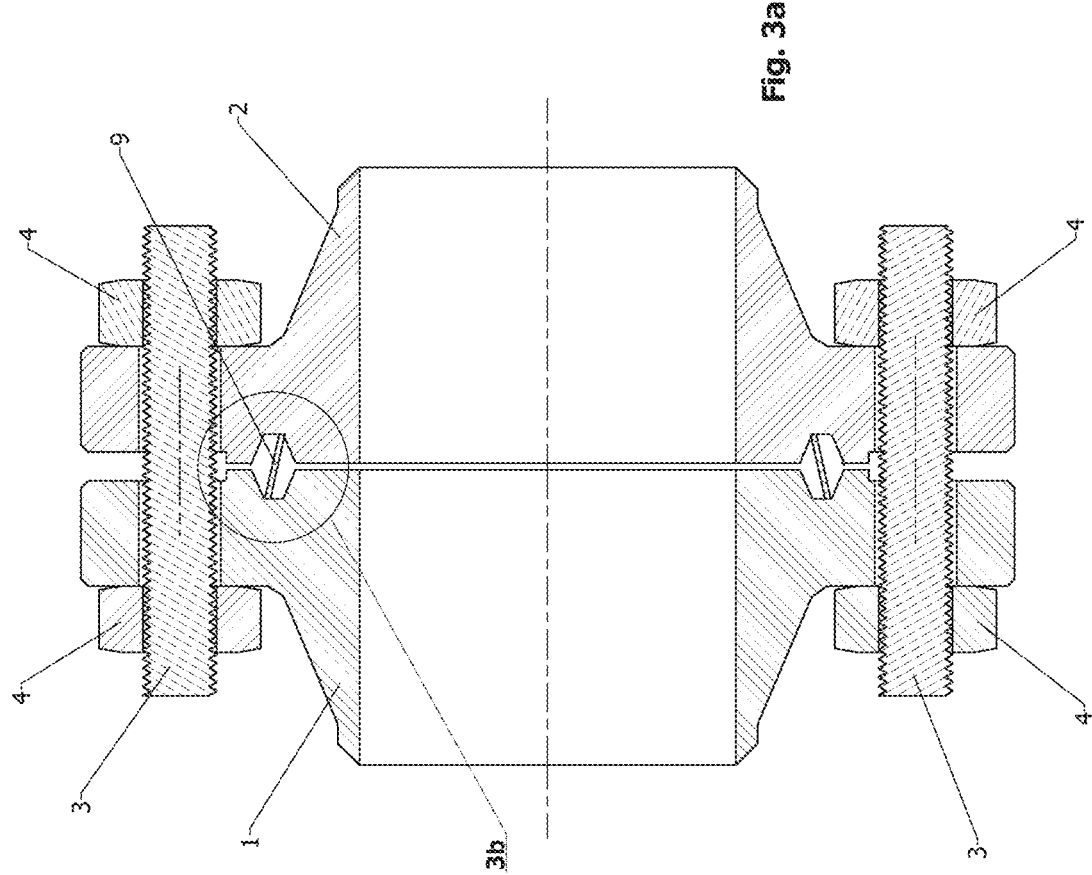

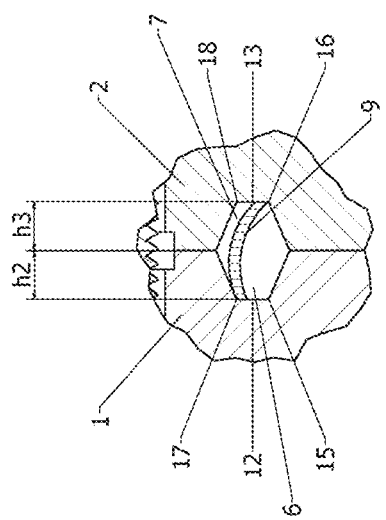
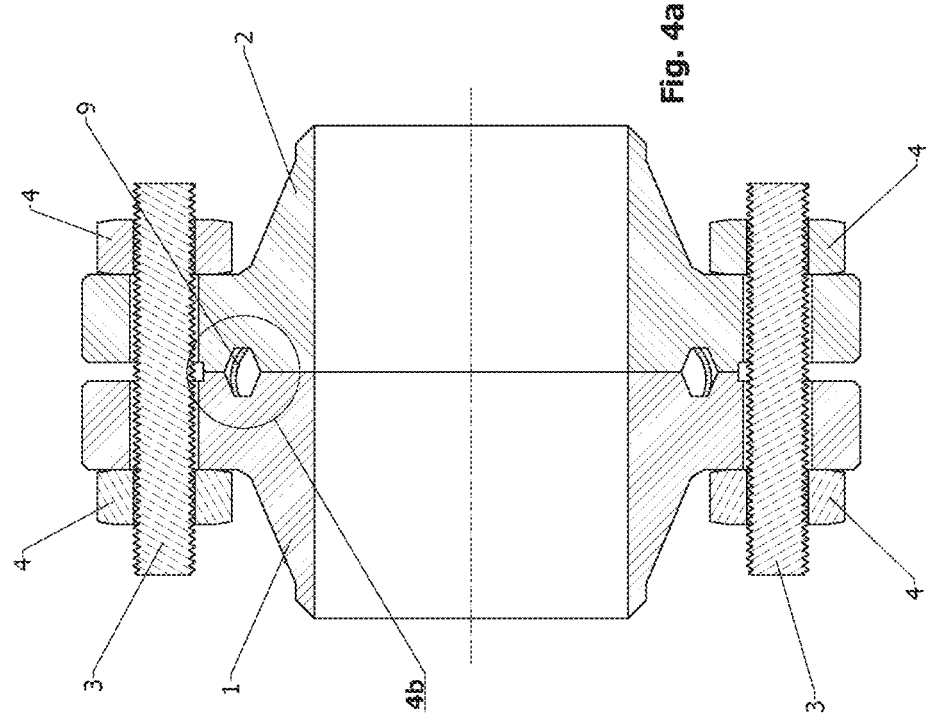

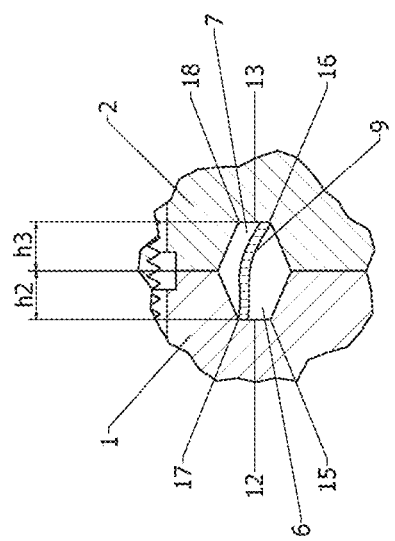
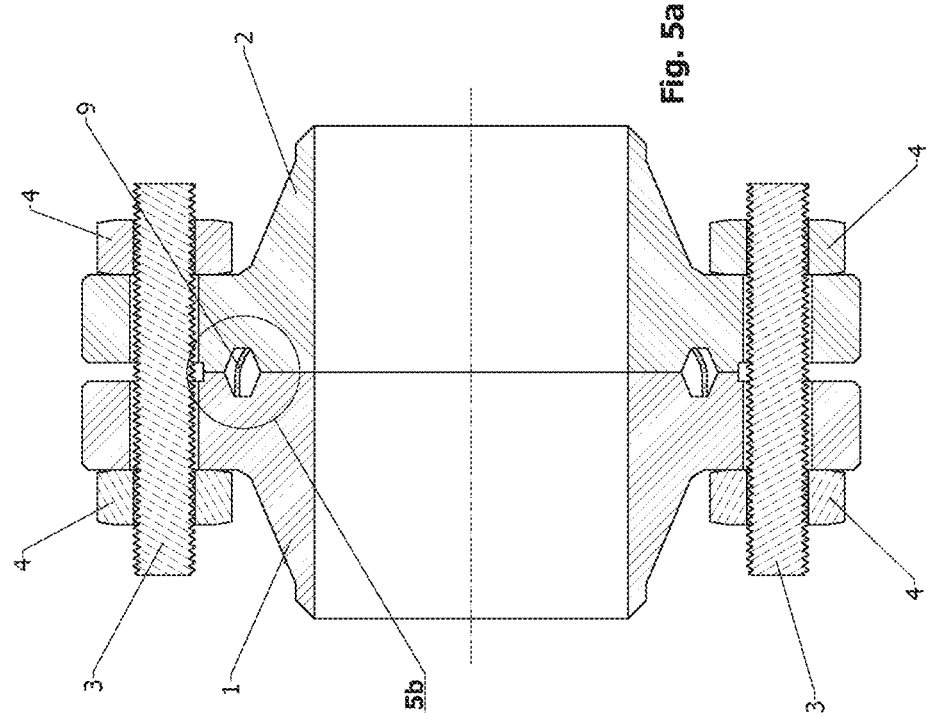

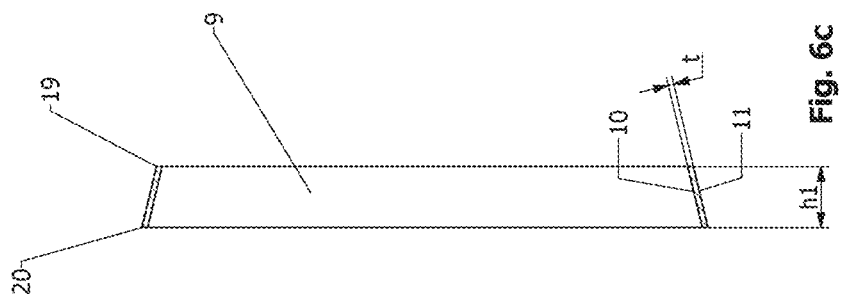
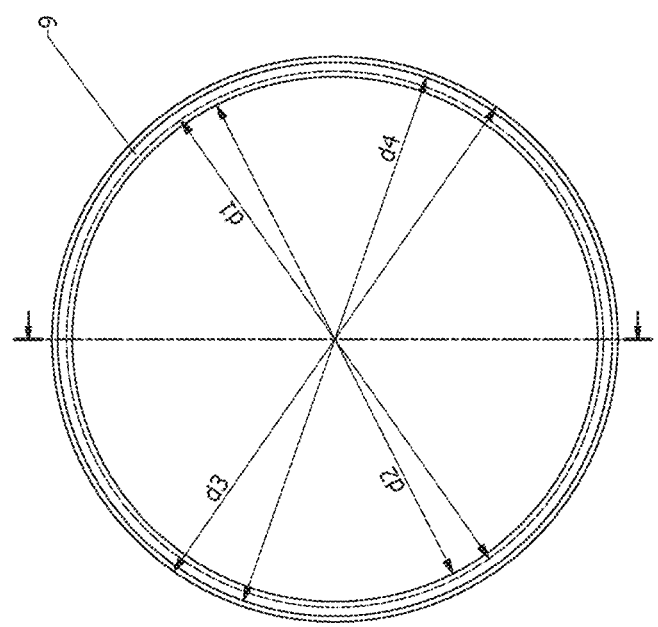
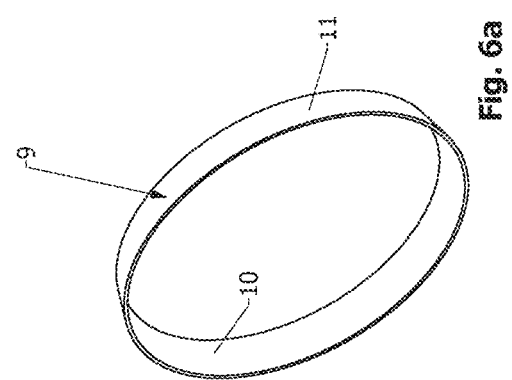

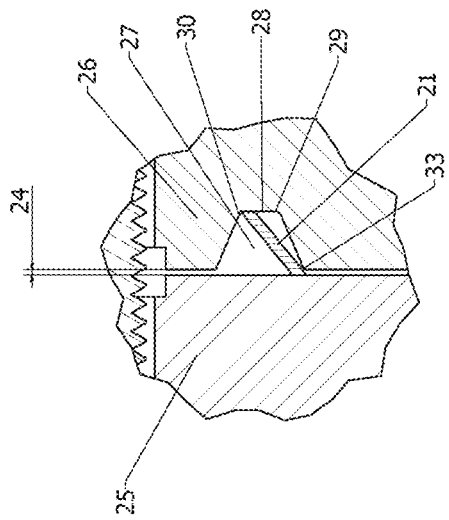
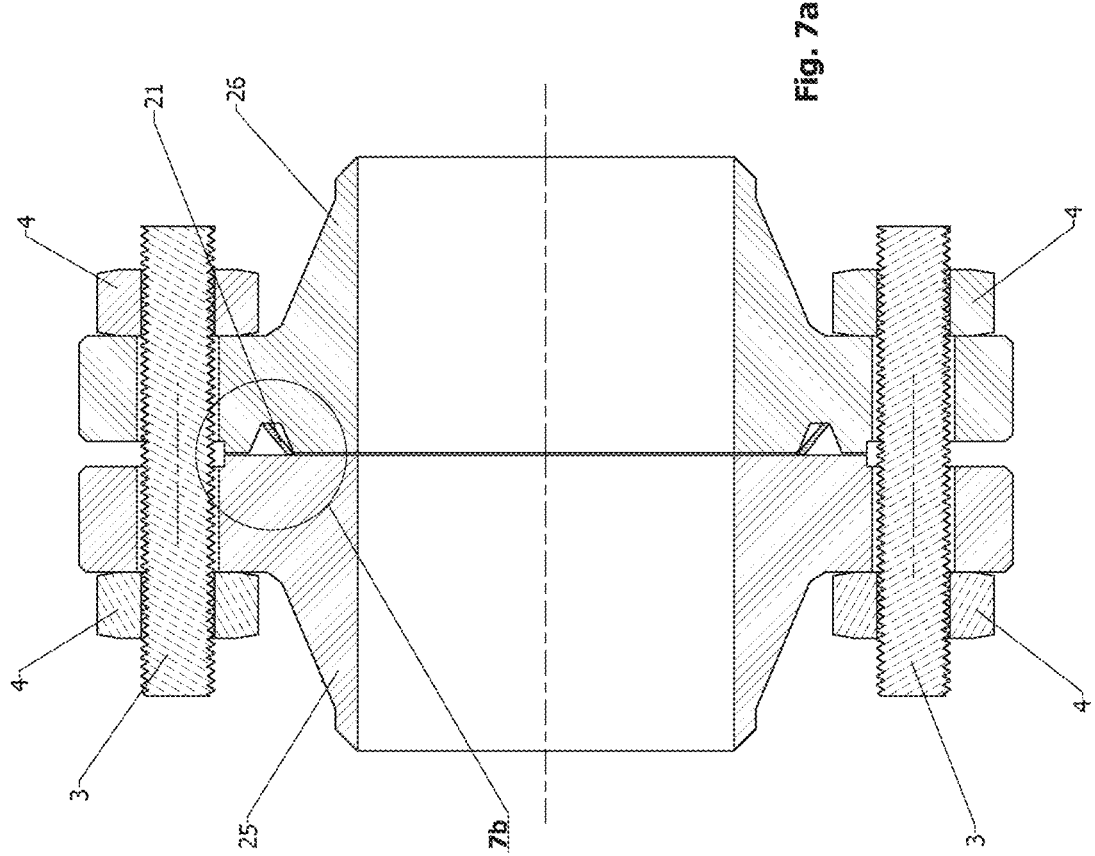

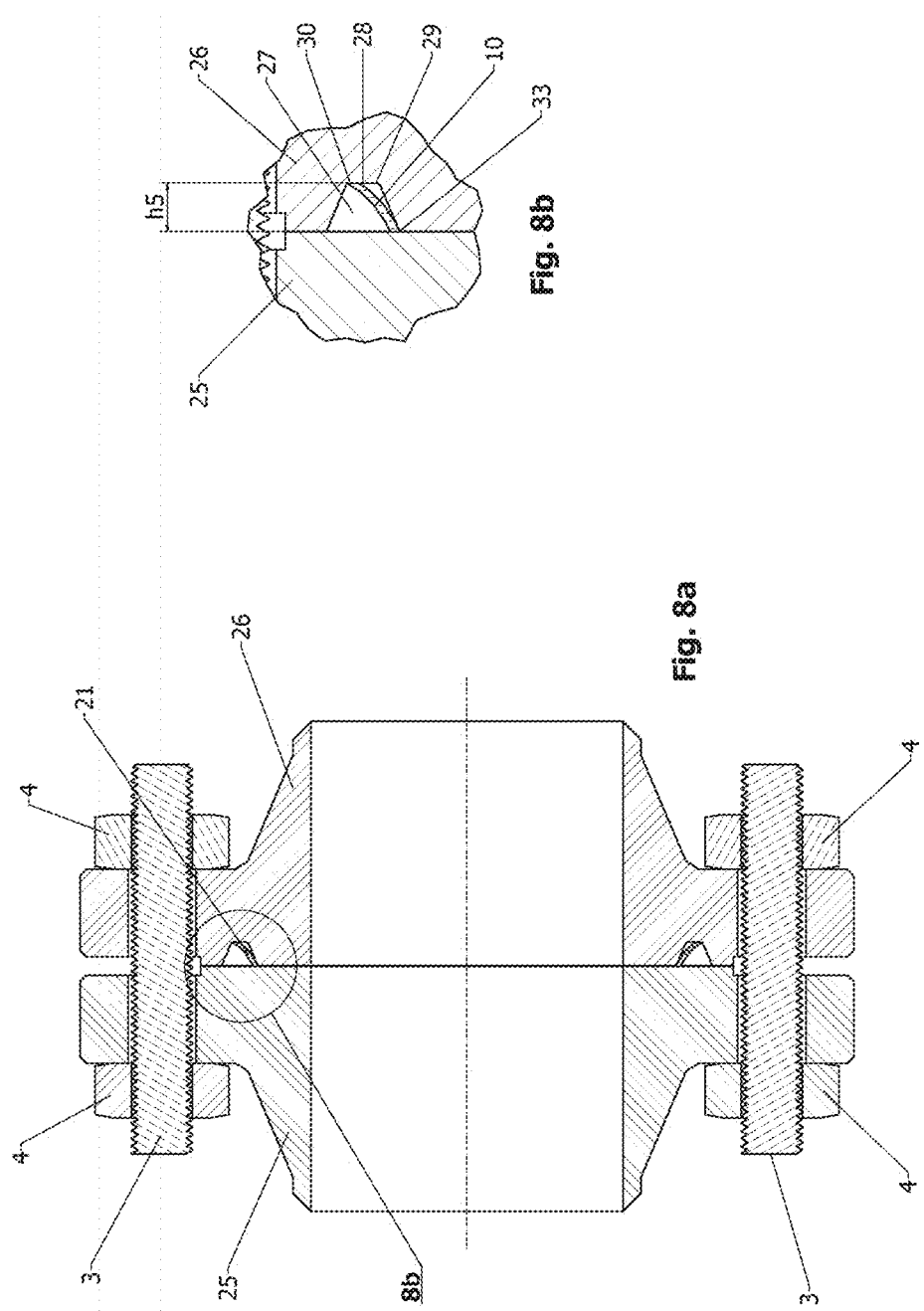

METHOD AND A DEVICE FOR SEALING BETWEEN ATTACHABLE PAIR OF PIPE FLANGES

BACKGROUND OF THE INVENTION

The present invention claims convention novelty priority from Norwegian Patent Application no. 20160084 filed on Jan. 19, 2016.

FIELD OF THE INVENTION

The present invention relates to a method and a device for sealing between attachable pair of pipe flanges, comprising:
- at least one of the flanges being configured with a circular groove in order to at least partly receiving a sealing ring which has its ring wall rectilinear as seen in a cross-section when front faces of the pipe flanges are spaced apart,
- a bottom of the groove exhibiting a first transition between the bottom and a radially located inner wall of the groove, and a second transition between the bottom and a radially located outer wall of the groove,
- the ring in side view exhibiting a shape like a truncated cone, and
- a first axial end of the sealing ring having a first inner diameter and a first outer diameter, and a second axial end of the sealing ring having a second inner diameter and a second outer diameter being larger than the first inner and outer diameters, respectively.

DESCRIPTION OF RELATED ART

Related prior art is e.g. described in U.S. Pat. Nos. 1,965,273 and 1,825,962. Further prior art related to joining pipe sections is e.g. DE 19,503,285 A1. Other publications describing a sealing ring having a shape like a truncated cone are described in U.S. Pat. Nos. 4,202,556 and 4,282,643 which relate to sealing ring in a gate valve.

In particular the related prior art references exhibit solutions for sealing where the pipe flanges do not abut each other and where leakages may occur if the flanges are not properly attached to each other or the pipe joint is exposed to undue bending and/or mechanical or thermal stress.

BRIEF SUMMARY OF THE INVENTION

The present invention has as an object to alleviate deficiencies of prior art solutions and provide a simple and efficient solution to deficiencies of the prior art technique.
According to the method of the invention:
- the pipe flanges are attached to each other to yield that the flanges in operative state are forcibly held in an abutting and facial engagement, and
- upon tensioning of tensioning means to create said operative state, causing compressive forces to act onto the sealing ring to yield that its wall, as viewed in cross-section, is bent radially to exhibit a curved configuration.

Further embodiments of the method appear from the attached sub-claims 2-6.
According to the device of the invention:
- the pipe flanges are configured to be attached to each other to yield that the flanges in said operative state are forcibly held in an abutting and facial engagement, and
- upon tensioning of tensioning means to create said operative state, the wall of the sealing ring, as viewed in cross-section and due to compressive forces from said tensioning, is bent radially to exhibit a curved configuration.

Further embodiments of the device appear from the attached sub-claims 8-16.

BRIEF DESCRIPTION OF THE SEVERAL VIEWS OF THE DRAWINGS

FIG. 3a shows in an axially directed cross-section of a sealing ring located between a pair of pipe flanges each having ring receiving groove and prior to the pipe flanges being forcibly held in abutting, facial engagement, and FIG. 3b is an enlarged view of section 3b on FIG. 3a.

FIG. 4a shows the view of FIG. 3a, however with the pipe flanges being forcibly held in abutting, facial engagement and the ring wall being bent radially, and FIG. 4b is an enlarged view of section 4b on FIG. 4a.

FIG. 5a shows the view of FIG. 3a, however with the pipe flanges being forcibly held in abutting, facial engagement and the ring wall being bent radially and having a modest wavy shape, and FIG. 5b is an enlarged view of section 5b on FIG. 5a.

FIG. 6a is a perspective view of the sealing ring from one axial end thereof, FIG. 6b is a plan view of the sealing ring as viewed from said one end, and FIG. 6c is an axially directed cross-sectional view of the ring.

FIG. 7a shows an axially directed cross-sectional view of a sealing ring located between a pair of pipe flanges where only one flange thereof has a ring receiving groove and prior to the pipe flanges being forcibly held in abutting, facial engagement, and FIG. 7b is an enlarged view of section 7b on FIG. 7a.

FIG. 8a shows the view of FIG. 7a with the pipe flanges being forcibly held in abutting, facial engagement and the ring wall being bent radially, and FIG. 8b is an enlarged view of section 8b on FIG. 8a.

DETAILED DESCRIPTION OF THE INVENTION

Figure 1B:
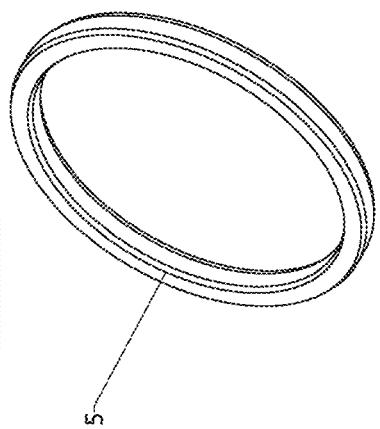
FIG. 1b is an enlarged view of a section 1b on FIG. 1a, and FIG. 1c shows in perspective view the prior art sealing ring.

As mentioned in the introduction, the present invention relates to a method and a device for sealing between attachable pair of pipe flanges. In one mode, both flanges have a groove or recess for receiving at least a part of a circular sealing ring, and in another mode only one flange of the two co-operative flanges is provided with such a groove or recess.

In order to join fluid communications for e.g. pipelines, valves and/or pumps there is conventionally used pipe flanges, e.g. of so-called RTJ type. Such joints are inter alia known to use a massive or solid ring of metal instead of a conventional ductile packing as a sealant between the flange faces. An example of such prior art structure and technique is shown on FIGS. 1a, 1b and 1c.

Flanges 1; 2 are attached to each other by means of bolts 3 and nuts 4. Although the bolts 3 are shown as threaded rods with nuts 4 for tightening, the bolts could have an integral head at one end to replace one of the nuts. Further, massive or solid sealing ring 5 of metal is provided at both axial end regions with an outer shape which corresponds to a cross-sectional shape of grooves 6; 7 in the flanges 1; 2.

In order to safeguard that the ring 5 obtains sufficient pressure onto the grooves 6, 7, the ring 5 has an axial dimension which is sufficient to create a gap 8 between the opposing faces of the flanges 1, 2 when the bolts 3 have been properly tensioned by the nuts 4. Thus, the front faces of the pair of flanges do not abut.

However, there will frequently be experienced obliqueness or distortions as regards pipeline installations, and when using such rings the tensioning operation of the bolts is extremely important in order not to damage the ring 5 or the grooves 6, 7 in the flanges 1, 2. To a certain extent the ring 5 and the grooves 6, 7 will mutually adapt through material metal flow, but a problem is then that the grooves could become skew or oblique. When the interconnection is opened and then reinstalled, then a leakage could arise because deformations in the materials which are to mate no longer coincide or correspond. If the grooves have to a certain extent been damaged, then the flanges 1; 2 must be removed by a cut-away process and new flanges welded onto the pipe.

If the interconnection of the flanges 1, 2 is exposed to thermal variations which affect the tensional forces in the bolts 3, the sealing ring 5 will not exhibit any resilient effect which can compensate for any slack in the tensioning of the bolts 3.

Compared to the flanges 1, 2 and other operational members of an installation, the sealing ring 5 represents a modest part of the overall weight, but the rings 5 are often transported in large volumes, and high weight is then disadvantageous as regards cost to be met by a manufacturer, a supplier and/or an end-user.

Figure 1C:
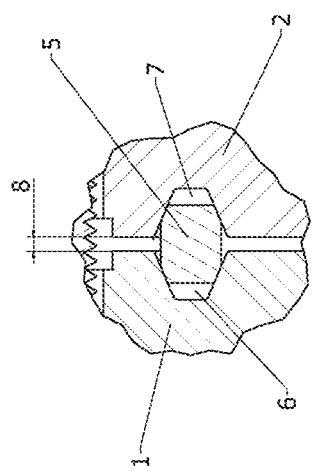
FIG. 1a shows in axially directed cross-section prior art pipe flanges attached to each other and having a prior art sealing ring therebetween.
Figure 1A:
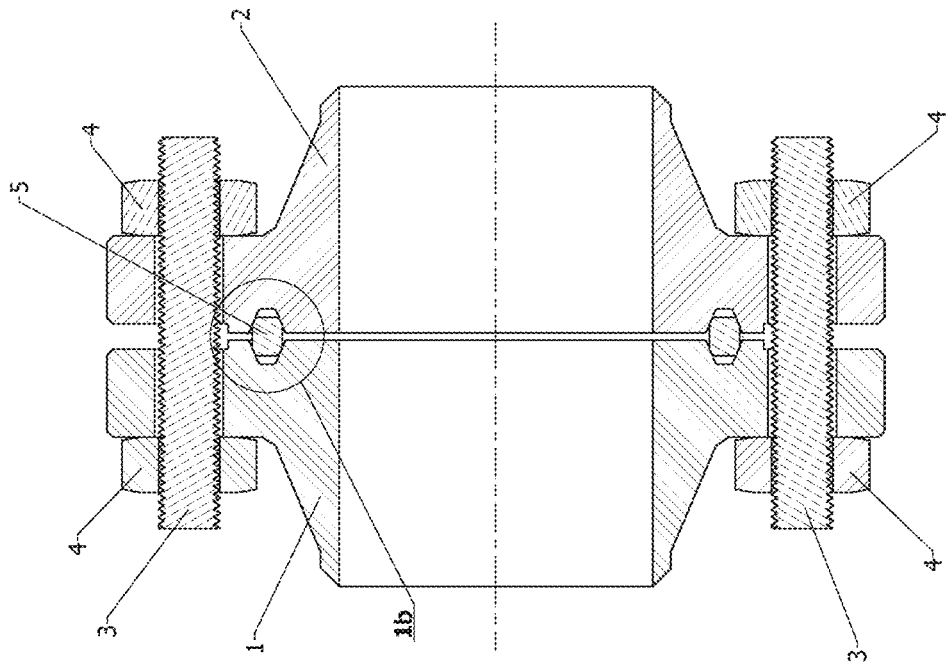
Figure 2:
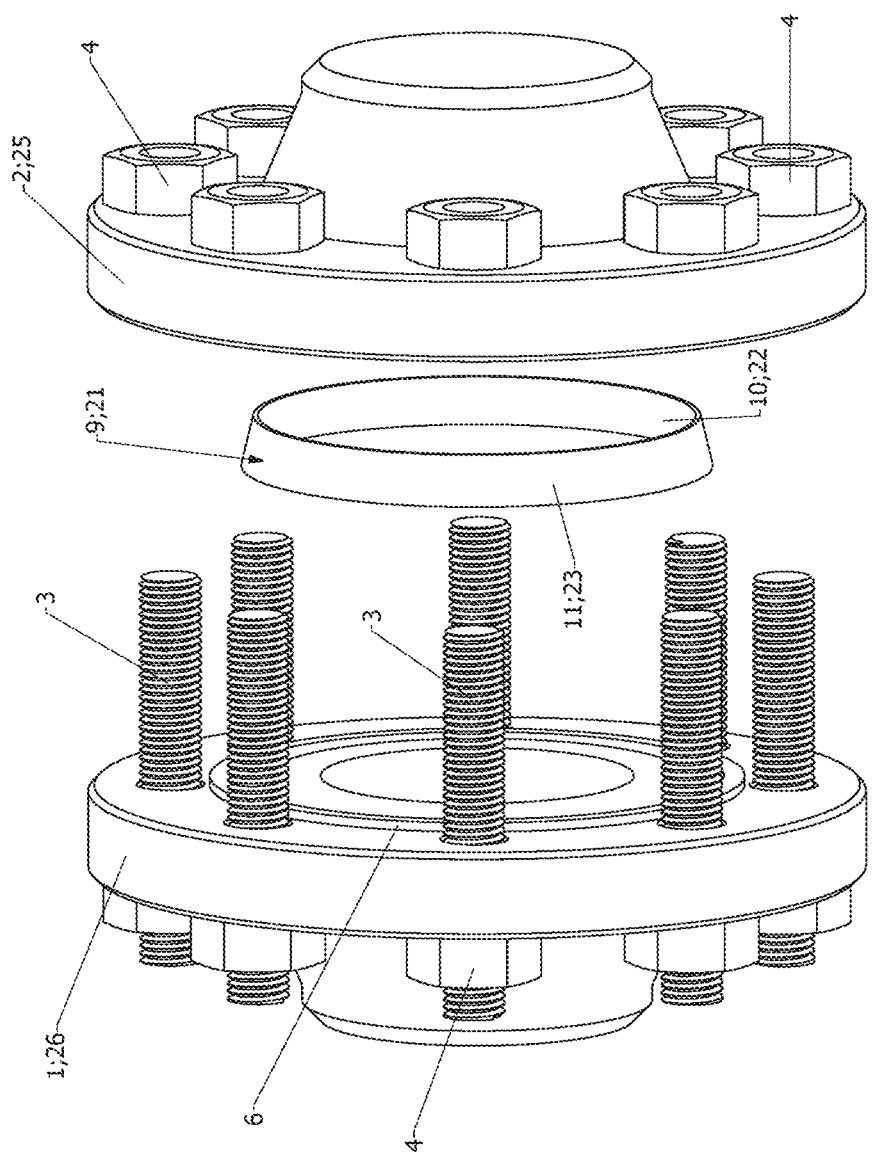
FIG. 2 shows in exploded view a sealing ring of the invention to engage pipe flanges.

The present invention, as initially presented in exploded view on FIG. 2 departs substantially from the prior art as shown on FIGS. 1a-1c in that a sealing ring 9 is provided. Compared to the prior art ring 5, the ring 9 is thin walled and of conical configuration. In a typical side view, it looks like a truncated cone.

In the present context, such a novel ring 9 will be compatible in operation with well known flanges having grooves 6; 7 and the ring 9 will not damage the flanges 1 and 2 upon installation, even when there is a relatively large mutual flange obliqueness as an outset. Further, the ring 9 has a desirable resilient effect, enabling the flange faces to facially abut and forcibly be pressed against each other, yielding a very stable flange interconnection.

It will be appreciated as regards the sealing ring 9 that both amount of material required and its weight will be substantially reduced, as the ring 9 could be stamped out from plate material instead of having to be machined from a basic material. Still further, the sealing ring 9 may be re-used multiple times.

A distinctive feature of the invention is not merely the sealing ring 9 (which is partly known from the previously mentioned prior art references U.S. Pat. Nos. 1,965,273 and 1,825,962), but the fact that the flange faces are brought to forcibly abut and engage, and that the ring wall is bent upon tightening the bolts 3 by means of the nuts 4.

FIGS. 3a and 3b illustrate installation of the sealing ring 9 into the grooves 6; 7 of the flanges 1; 2. The installation is per se made in a way similar to the prior art installation shown on FIGS. 1a-1c, however with the desirable exception that the ring 9 according to the invention can be attached to one or the other of the flanges 1; 2 by inherit wedging action into a groove 6 or 7 before installation, i.e. to cause the flanges 1; 2 to be forcibly attached to each other and facially abut and engage. This facilitates a more simplified assembly and attachment of a pair of pipe flanges 1, 2.

As will be appreciated, the views of FIGS. 3a and 3b illustrate the state of installation prior to tightening or tensioning of the bolts 3 by means of the nuts 4. It is noted that from the cross-section of the sealing ring 9 that its wall is rectilinear, i.e, with an inside 10 and an outside 11 of the ring wall being rectilinear (See FIG. 6c). It is noted that there is a gap 12 (comparable with the gap 8 on FIG. 1b) between the front faces of the flanges 1, 2.

It is noted that that the grooves 6; 7 have a bottom 13; 14, first and inner transition 15; 16 between the bottom 13; 14 and an adjacent groove wall, and a second and outer transition 17; 18 between the bottom 13; 14 and an adjacent groove wall.

The sealing ring 9 has a first axial end 19 and a second axial end 20, as seen on FIG. 6c. The outer diameter d1 and the inner diameter d2 of the ring at the first end 19 are smaller than the outer diameter d3 and the inner diameter d4 at the second end 20, respectively. I.e. d1>d2 and d3>d4 and d3>d4>d1>d2. The thickness of the ring 9 is a function of (d1−d2) and/or (d3−d4). Suitably, (d1−d2)=(d3−d4). The diameter d3 is dependent on and suitably corresponds to the diameter of the transition 17 (or 18), and the smallest diameter d2 is dependent on and suitably corresponds to the diameter of the transition 16 (or 15).

The sealing ring 9 is brought with its second end 20 into contact with the second transition 17 of the groove 6 in a first one 1 of the flanges, and is brought with its first end 19 into contact with the first transition 16 of the groove 7 in a second one 2 of the flanges 1, 2.

Upon a further tightening of the threaded bolts 3 by means of the nuts 4, then the sealing ring 9 will be subject to a very high compressive pressure forces. At some point in the tightening operation, the ring 9 will reach a yield point and its wall will start to resiliently bend into a curved configuration. In the example shown on FIGS. 4a and 4b, the bending is radially outwards, yielding that the wall inside 10 exhibits a concave like shape and the wall outside 11 correspondingly exhibits a convex like shape. The first and second ends 19, 20 of the ring 9 have then already adapted in shape to their seating at the groove transitions 16, 17, respectively.

Dependent on wall thickness or material properties of the sealing ring 9, the ring wall could upon said very high compressive pressure instead—in cross-section—assume a bending as well as a modest wavy configuration, as indicated on FIGS. 5a and 5b.

FIGS. 4a, 4b, 5a and 5b clearly illustrate the state of flange attachment when the flanges 1; 2 forcibly abut and engage with their respective front face due to the effect of said very high compressive force. The gap 12 as shown on FIGS. 3a and 3b is no longer present.

The curved configuration of the ring wall cross-section yields that the ring 9 spans between the groove transitions 16 and 17, and any variation on compressive force is duly taken care of by the resiliency present in the ring wall.

Until this point in the tightening operation of the bolts 3, the tightening may have been unequal due to some mutual flange obliqueness. However, from this operational point in time, the bolts 3 will be further tensioned according to table specifications related to different and applicable classes or groups of operational pipe pressures. In this situation, it is safeguarded that the abutment or engagement faces of the flanges 1; 2 will indeed remain in proper contacting mutual engagement. Accordingly, the attachment of the flanges and the joint thus made will be in a static state until steps are taken to separate the pair of flanges 1; 2. Thus, the sealing will be unaffected by any external dynamics in an associated piping system, such as e.g. bending, pulsation, vibration and/or thermal fluctuations.

When viewing FIGS. 6*a*, 6*b* and 6*c*, the sealing ring 9 has an axial height h1 which is related to the depth h2; h3 of the grooves 6; 7 (see FIGS. 4*b* and 5*b*). Typically, h2=h3. In order to obtain the required bending of the ring wall (as seen in cross-section), h1>h2+h3.

The wall thickness t of the ring 9 is dependent on required class of pressure and may accordingly vary according to applied pressure range. Further, the higher the pressure class is, the higher becomes the value of t/d3.

It will be appreciated that the weight of the sealing ring according to the invention will for most pressure and dimensional applications be substantially lower than the weight of the conventional, massive or solid metal sealing ring 5 as shown in FIGS. 1*a*-1*c*.

There are different types of flanges and they may have different types of grooves for sealing rings. The sealing ring 9 of the invention can be used for all types of grooves through required adjustment of the values of the previously mentioned parameters, i.e. the gap 12, the diameters d3 and d2, and the wall thickness t.

The functionality of the device and the method of the invention is supported by repeated laboratory tests, including the option of a re-use of the sealing ring. The flange connection as explained also meets all requirements to be set as regards tightness and occurrence of any excess pressure.

There are also situations where such flanges having a groove 6; 7 as shown are to be connected a corresponding flange with corresponding dimensions, but which has no groove on its front face.

An example of such configuration is shown on FIGS. 7*a*, 7*b*, 8*a*, 8*b*, and 9*a*-9*c*.

This other configuration of the present invention, as initially presented in exploded view on FIG. 2, departs substantially from the prior art in that an axially shorter sealing ring 21 is provided. Compared to the prior art ring 5, the ring 21 is thin walled and of conical configuration, like the previously discussed ring 9, and in a typical side view, it also looks like a truncated cone.

In the present context, such a novel ring 21 will be compatible in operation with well known flanges where in a pair of flanges only one flange has a groove 27 in the front face thereof and the ring 21 will not damage the flanges 25 and 26 upon installation, even when there is a relatively large mutual flange obliqueness as an outset. Further, the ring 21 has a desirable resilient effect, enabling the flange faces to facially abut and forcibly be pressed against each other, yielding a very stable flange interconnection and attachment.

It will be appreciated as regards the sealing ring 21 that both reduced amount of material required and its weight will be substantially reduced, as the ring 21, like the ring 9, could be stamped out from plate material instead of having to be machined from a basic material. Still further, the sealing ring may be re-used multiple times.

A distinctive feature of the invention is not merely the sealing ring 21 (which is partly known from the previously mentioned prior art references U.S. Pat. Nos. 1,965,273 and 1,825,962), but the fact that the flange faces are brought to forcibly abut and engage, and that the ring wall is bent upon tightening of the bolts 3 by means of the nuts 4.

The views of FIGS. 7*a* and 7*b* illustrate the state of installation prior to tightening or tensioning of the bolts 3 by means of the nuts 4. It is noted that from the cross-section of the sealing ring 21 that its wall is rectilinear, i.e, with the inside 22 and the outside 23 of the ring wall being rectilinear. It is noted that there is a gap 24 (comparable with the gap 12 on FIG. 3*b*) between the front faces of the flanges 25; 26.

It is noted that that the groove 27 has a bottom 28, a first and inner transition 29 between the bottom 28 and an adjacent groove wall, and a second and outer transition 30 between the bottom 28 and an adjacent groove wall.

Figure 9C:
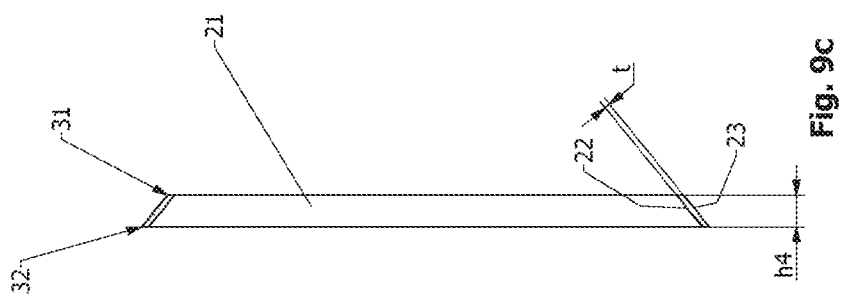
FIG. 9c is an axially directed cross-sectional view of the ring.

The sealing ring 21 has a first axial end 31 and a second axial end 32, as seen on FIG. 9*c*. The outer diameter d1 and the inner diameter d2 of the ring 21 at the first end 31 are smaller than the outer diameter d3 and the inner diameter d4 at the second end 32, respectively. I.e. d1>d2 and d3>d4 and d3>d4>d1>d2. The thickness of the ring 21 is a function of (d1−d2) and (d3−d4). Suitably, (d1−d2)=(d3−d4). The diameter d3 is dependent on and suitably corresponds to the diameter of the transition 30, and the ring 21 has its axial end 31 abutting the front face of the flange 25 which has no sealing ring groove. The sealing ring 21 is brought with its second axial end 32 into contact with the second transition 30 of the groove 27 in flange 26. Further, when viewing FIG. 7*b*, it is also seen that an outer region of the sealing ring 21 at a region of its first axial end 31 contacts an inner edge region 33 of a mouth of the groove 27.

Upon a further tightening of the threaded bolts 3 by means of the nuts 4, then the sealing ring 21 will be subject to a very high compressive pressure. At some point in the tightening operation, the ring 21 will reach an yield point and its wall will start to resiliently bend into a curved configuration. In the non-limiting example shown on FIGS. 8*a* and 8*b*, the bending is radially inwards, yielding that the wall inside 22 exhibits a convex like shape and the wall outside 23 correspondingly exhibits a concave like shape. The first and second ends 31, 32 of the ring 21 have then already adapted in shape to their seating onto the front surface of the flange 25 and the groove transition 30, respectively.

Dependent on wall thickness or material properties of the sealing ring 21, the ring wall could upon said very high compressive pressure force instead—in cross-section—assume a bending as well as a modest wavy configuration.

Figure 9B:
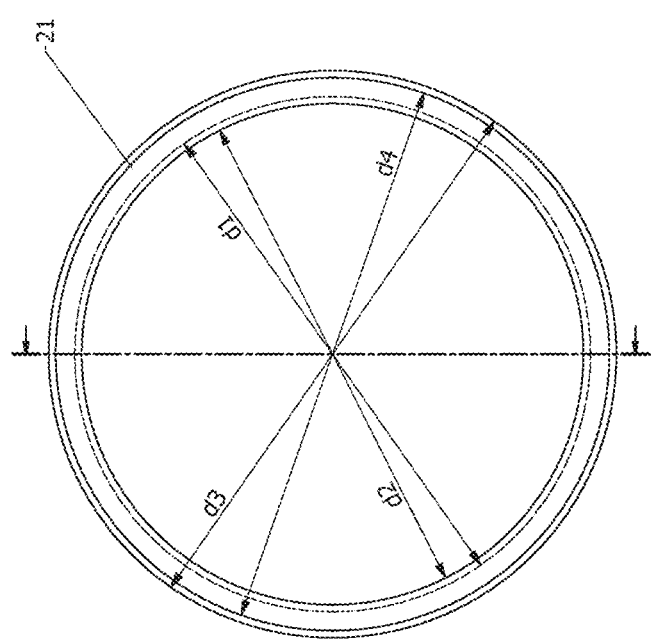
FIG. 9b is a plan view of the sealing ring as viewed from said one axial end.
Figure 9A:
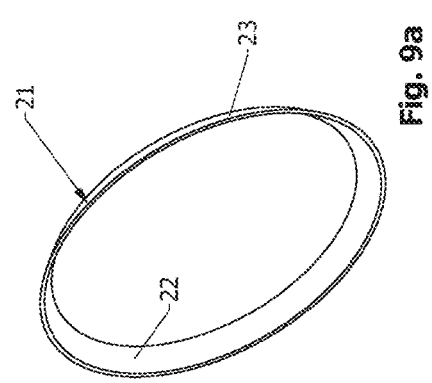
FIG. 9a is a perspective view of the sealing ring from one axial end thereof, the ring as shown having less axial dimension than that of FIG. 6a-6c and to be used with the embodiment as shown on FIGS. 7a, 7b, 8a and 8b.

When viewing FIGS. 9*a*, 9*b* and 9*c*, the sealing ring 21 has an axial height h4 which is related to the depth h5 of the groove 27 (see FIGS. 7*b* and 8*b*). In order to obtain the required bending of the ring wall (as seen in cross-section on FIGS. 8*a* and 8*b*), h4>h5.

The bending of the wall of the ring 21 (as seen in cross-section) is important to safeguard that proper sealing is maintained even in the case of excess or fluctuating pipe-fluid pressure, any bending forces and/or thermal changes.

As noted from viewing FIGS. 3*b* and 7*b* that radial radius of curvature of the second transition 17; 30 is adapted to the outer diameter d4 of the second axial end 20; 32 of the sealing ring 9; 21. Further, as noted from FIG. 3*b*, the radial radius of curvature of the first transition 16 is adapted to the inner diameter of the ring 9 at its first axial end 19.

As regards the embodiment shown on FIGS. 3*a*, 3*b*, 4*a* and 4*b*, 5*a*, 5*b* it will be appreciated that the ring 9 could have been turned 180 degrees to let its first axial end 19 engage the groove 6, and its second axial end 20 engage the track 7, i.e. a mirror image of what is seen on FIGS. 3*a*, 3*b*, 4*a* and 4*b* and with reference numerals properly interchanged.

Further, dependent on the physical and mechanical properties of the sealing ring 9, upon compression to close the gap 12, the wall of the ring 9 as shown in cross-section on FIGS. 3*a*, 3*b*, 4*a*, 4*b*, 5*a*, 5*b* could be bent radially inwards.

Still further, dependent on the physical and mechanical properties of the sealing ring 21, upon application of compressive forces to close the gap 24, the wall of the ring 21 as shown in cross-section on FIGS. 7*a*, 7*b*, 8*a*, 8*b*, 9*a*-9*c* could be bent radially outwards.

Although the sealing ring 21 as shown on FIGS. 7*a*, 7*b*, 8*a* and 8*b* could be configured to have its first axial end 31 engaging the transition 29 and its second axial end 32 bearing against the front surface of the flange 25, it is currently preferred to have the configuration as actually shown on FIGS. 7*a*, 7*b*, 8*a* and 8*b* to yield that the sealing engagement between the ring 21 and the front face of flange 25 is as close to an axial centre line through the flanges as possible.

Suitably, the groove 6; 7; 27 has a cross-sectional shape of a truncated cone or a trapezoid, with the smallest cross-dimension at the bottom of the groove and the largest cross-dimension at the mouth of the groove, i.e. at the front face of the flange 1; 2; 26.

The first transition 15; 16; 29 and the second transition 17; 18; 30 could, when viewed in cross-section, have the shape of an obtuse or right angle, or have a curved shape. Similarly, the edge 33 at the mouth of the groove 27 could in cross-section have a curved shape. Indeed, both the inner and outer edges of the mouth of a groove could have a curved shape when viewed in cross-section.

The invention claimed is:

1. A method for sealing between attachable pair of pipe flanges held together by tensioning means, the method comprising:
   at least one of the flanges being configured with a circular groove in order to at least partly receive a sealing ring which has its ring wall rectilinear as seen in a cross-section when front faces of the pipe flanges are spaced apart;
   a bottom of the groove exhibiting a first transition between the bottom and a radially located inner wall of the groove, and a second transition between the bottom and a radially located outer wall of the groove;
   the ring in side view exhibiting a shape like a truncated cone;
   a first axial end of the sealing ring having a first inner diameter and a first outer diameter, and a second axial end of the sealing ring having a second inner diameter and a second outer diameter, said second inner diameter and said second outer diameter being larger than the first inner and outer diameters, respectively;
   attaching the pipe flanges to each other such that the flanges in operative state are forcibly held in an abutting and facial engagement; and
   upon tensioning of the tensioning means to create the operative state, causing compressive forces to act onto the sealing ring such that its wall, as viewed in cross-section, is bent radially to exhibit a curved configuration.

2. The method of claim 1, wherein the wall of the sealing ring, upon the tensioning, as viewed in cross-section, is bent to give its inside or outside a concave shape, and its outside or inside a convex shape, respectively.

3. The method according to claim 1, wherein the wall of the sealing ring, upon the tensioning, as viewed in cross-section, is bent to exhibit a modest wavy shape.

4. The method according to claim 1, with each flange of a pair of flanges exhibiting a front face with a groove for engagement with an axial end of the sealing ring, wherein the sealing ring is positioned to engage with its second axial end the second transition of the groove in a first one of the flanges, and is positioned to engage with its first axial end the first transition of the groove in a second one of the flanges.

5. The method of claim 1, with only one flange of a pair of flanges exhibiting front face with a groove for engagement with an axial end of a sealing ring, wherein the sealing ring is positioned to engage with its second axial end the second transition of the groove in the one of the flanges, and wherein the sealing ring is positioned to engage with its first axial end a front face of the other one of the pair of flanges which does not exhibit any sealing ring engagement groove.

6. The method of claim 5, wherein an inside of the first axial end of the ring is located to make contact with an inner edge region of a mouth of the groove in the one flange.

7. The method of claim 1, wherein the groove in longitudinally directed cross-section of the pipe flange has a shape like an isosceles trapeziod, its mouth being wider than its bottom.

8. The method of claim 7, wherein the flange having said groove is of RTJ-type.

9. An assembly for sealing between attachable pair of pipe flanges, the assembly comprising a pair of pipe flanges, tensioning means and a sealing ring,
   wherein at least one of the flanges is configured with a circular groove in order to at least partly receive the sealing ring which has its ring wall rectilinear as seen in a cross-section when front faces of the pipe flanges are spaced apart;
   wherein a bottom of the groove exhibits a first transition between the bottom and a radially located inner wall of the groove, and a second transition between the bottom and a radially located outer wall of the groove;
   wherein the ring in side view exhibits a shape like a truncated cone;
   wherein a first axial end of the sealing ring has a first inner diameter and a first outer diameter, and a second axial end of the sealing ring has a second inner diameter and a second outer diameter, said second inner diameter and said second outer diameter being larger than the first inner and outer diameters, respectively; and
   wherein the pipe flanges are configured to be attached to each other such that the flanges in an operative state are forcibly held in an abutting and facial engagement, and upon tensioning of the tensioning means to create the operative state, that the wall of the sealing ring, as viewed in cross-section and due to compressive forces from the tensioning, is configured to be bent radially to exhibit a curved configuration.

10. The assembly of claim 9, wherein the wall of the sealing ring upon the tensioning, as viewed cross-section, is bent to give:
    its a) inside or b) outside a concave shape, and correspondingly
    its a) outside or b) inside a convex shape, respectively.

11. The assembly according to claim 9, wherein the wall of the sealing ring upon the tensioning, as viewed in cross-section, exhibits a modest wavy shape.

12. The assembly according to claim 9, wherein each flange of a pair of flanges exhibits a front face with a groove for engagement with an axial end of the sealing ring, wherein the sealing ring engages with its second axial end the second transition of the groove on a first one of the flanges, and wherein the sealing ring engages with its first axial end the first transition of the groove on a second one of the flanges.

13. The assembly of claim 12, wherein a pair of opposing pipe flanges exhibit a sum of their respective groove depth, and wherein axial length of the sealing ring, prior to tensioning of the tensioning means, exceeds the groove depth sum.

14. The assembly of claim 9, wherein only one flange of a pair of flanges exhibits a front face with a groove for engagement with an axial end of a sealing ring, wherein the sealing ring engages with its second axial end the second transition of the groove in the one of the flanges, and wherein the sealing ring engages with its first axial end a front face of the other one of the pair of flanges which does not exhibit any sealing ring engagement groove.

15. The assembly of claim 14, wherein an inside of the first axial end of the ring makes contact with an inner edge region of a mouth of the groove in the one flange.

16. The assembly of claim 14, wherein axial length of the sealing ring exceeds groove depth in the ring groove in the one of the flanges.

17. The assembly of claim 9, wherein wall thickness of the sealing ring is related to difference between outer diameter and inner diameter of the ring at its repective axial ends.

18. The assembly of claim 9, wherein the groove in longitudinally directed cross-section of the pipe flange has a shape like a truncated cone or a trapeziod, its mouth being wider than its bottom.

19. The assembly of claim 9, wherein the groove in longitudinally directed cross-section of the pipe flange has a shape like an isosceles trapeziod, its mouth being wider than its bottom.

20. The assembly of claim 19, wherein the flange having said groove is of RTJ-type.

21. An assembly for sealing between attachable pair of pipe flanges, the assembly comprising a pair of pipe flanges, tensioning means and a sealing ring,
    wherein at least one of the flanges is configured with a circular groove in order to at least partly receive the sealing ring which has its ring wall rectilinear as seen in a cross-section when front faces of the pipe flanges are spaced apart;
    wherein a bottom of the groove exhibits a first transition between the bottom and a radially located inner wall of the groove, and a second transition between the bottom and a radially located outer wall of the groove;
    wherein the groove in longitudinally directed cross-section of the pipe flange has a shape like an isosceles trapeziod, its mouth being wider than its bottom;
    wherein the ring in side view exhibits a shape like a truncated cone;
    wherein a first axial end of the sealing ring has a first inner diameter and a first outer diameter, and a second axial end of the sealing ring has a second inner diameter and a second outer diameter, said second inner diameter and said second outer diameter being larger than the first inner and outer diameters, respectively; and
    wherein the pipe flanges are configured to be attached to each other such that the flanges in an operative state are forcibly held in an abutting and facial engagement, and upon tensioning of the tensioning means to create the operative state, that the wall of the sealing ring, as viewed in cross-section and due to compressive forces from the tensioning, is configured to be bent radially to exhibit a curved configuration.

22. The assembly of claim 21, wherein the wall of the sealing ring upon the tensioning, as viewed cross-section, is bent to give:
    its a) inside or b) outside a concave shape, and correspondingly
    its a) outside or b) inside a convex shape, respectively.

23. The assembly according to claim 21, wherein the wall of the sealing ring upon the tensioning, as viewed in cross-section, exhibits a modest wavy shape.

24. The assembly according to claim 21, wherein each flange of a pair of flanges exhibits a front face with a groove for engagement with an axial end of the sealing ring, wherein the sealing ring engages with its second axial end the second transition of the groove on a first one of the flanges, and wherein the sealing ring engages with its first axial end the first transition of the groove on a second one of the flanges.

25. The assembly of claim 24, wherein a pair of opposing pipe flanges exhibit a sum of their respective groove depth, and wherein axial length of the sealing ring, prior to tensioning of the tensioning means, exceeds the groove depth sum.

26. The assembly of claim 21, wherein only one flange of a pair of flanges exhibits a front face with a groove for engagement with an axial end of a sealing ring, wherein the sealing ring engages with its second axial end the second transition of the groove in the one of the flanges, and wherein the sealing ring engages with its first axial end a front face of the other one of the pair of flanges which does not exhibit any sealing ring engagement groove.

27. The assembly of claim 26, wherein an inside of the first axial end of the ring makes contact with an inner edge region of a mouth of the groove in the one flange.

28. The assembly of claim 26, wherein axial length of the sealing ring exceeds groove depth in the ring groove in the one of the flanges.

29. The assembly of claim 21, wherein wall thickness of the sealing ring is related to difference between outer diameter and inner diameter of the ring at its repective axial ends.

30. The assembly of claim 21, wherein the flange having said groove is of RTJ-type.

\* \* \* \* \*